United States Patent [19]

Aziz

[11] Patent Number: 5,416,842
[45] Date of Patent: May 16, 1995

[54] METHOD AND APPARATUS FOR KEY-MANAGEMENT SCHEME FOR USE WITH INTERNET PROTOCOLS AT SITE FIREWALLS

[75] Inventor: Ashar Aziz, Fremont, Calif.

[73] Assignee: Sun Microsystems, Inc., Mountain View, Calif.

[21] Appl. No.: 258,344

[22] Filed: Jun. 10, 1994

[51] Int. Cl.$^6$ .......................... H04L 9/30; H04L 9/08; H04L 9/00
[52] U.S. Cl. ......................................... 380/30; 380/4; 380/21; 380/23; 380/25; 380/49
[58] Field of Search .................... 380/4, 21, 23, 25, 30, 380/46, 49, 50; 371/68.3

[56] References Cited

U.S. PATENT DOCUMENTS 4,916,704  4/1990  Bruckert et al. .................... 371/68.3

OTHER PUBLICATIONS

Whitfield Diffie, "The First Ten Years of Public-Key Cryptography", (Proceedings of the IEEE, vol. 76, No. 5, May 1988).
Paul Fahn, "Answers to Frequently Asked Questions About Today's Cryptography", (RSA Laboratories, 1992).
"Part I: Message Encryption and Authentication Procedures", (Privacy Enhancement for Internet Electronic Mail, J. Linn (Network Working Group), Feb., 1993.
"Part II: Certificate-Based Key Management", (Privacy Enhancement for Internet Electronic Mail, S. Kent (Network Working Group), Feb., 1993.
"Part III: Algorithms, Modes, and Identifiers", (Privacy Enhancement for Internet Electronic Mail), D. Balenson (Network Working Group), Feb., 1993.
"Part IV: Key Certification and Related Services" (Privacy Enhancement for Internet Electronic Mail), B. Kaliski (Network Working Group), Feb., 1993.
Whitfield Diffie, Paul C. Van Oorschoot and Michael J. Wiener, "Authentication and Authenticated Key Exchanges" (Designs, Codes and Cryptography, 2-10-7-125 (1992), Kluwer Academic Publishers).
"The MD5 Message-Digest Algorithm"; MIT Laboratory for Computer Science and RSA Data Security, Inc. (1992), R. Rivest (Network Working Group).
RSA Data Security, Inc. Technology Bulletin, copy undated.

*Primary Examiner*—Bernarr E. Gregory
*Attorney, Agent, or Firm*—Irell & Manella

[57] ABSTRACT

The present invention includes a first data processing device (node I) coupled to a first private network and to a firewall server (FWA). Firewall server FWA is in turn coupled to a public network, such as the Internet. A second data processing device (node J) is coupled to a second private network which is coupled to the Internet through a firewall server (FWB). Node I provides a data packet including IP data and a destination address for the intended receiving node J to firewall FWA. Firewall FWA is provided with a secret value a, and a public value $\alpha^a$ mod p. Similarly, firewall FWB is provided with a secret value b and a public value $\alpha^b$ mod p. The firewall FWA obtains a Diffie-Hellman (DH) certificate for firewall FWB and determines the public value $\alpha^b$ mod p from the DH certificate. Firewall FWA then computes the value of $\alpha^{ab}$ mod p, and derives a key $K_{ab}$ from the value $\alpha^{ab}$ mod p. A transient key $K_p$ is randomly generated and is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA, and determines the public value of $\alpha^a$ mod p from the DH certificate. Firewall FWB computes the value of $\alpha^{ab}$ mod p, and derives the key $K_{ab}$. Firewall B utilizes the key $K_{ab}$ to decrypt the transient key $K_p$, and using the decrypted transient key $K_p$, firewall FWB decrypts the encrypted data packet received from FWA, thereby resulting in the recovery of the original data sent by node I in unencrypted form to the firewall FWA. The firewall FWB then transmits the decrypted data packet to the receiving node J over the second private network.

30 Claims, 9 Drawing Sheets

METHOD AND APPARATUS FOR KEY-MANAGEMENT SCHEME FOR USE WITH INTERNET PROTOCOLS AT SITE FIREWALLS

FIELD OF THE INVENTION

The present invention relates to the field of key management schemes, and more particularly, the present invention relates to the use of a key management scheme to encrypt data packets between site firewalls on the Internet.

ART BACKGROUND

As businesses increasingly utilize public networks, such as the Internet, to provide site-to-site connectivity, a common need exists to secure the data traffic as it traverses the public portions of the network. In the Applicant's related co-pending patent application entitled "Method and Apparatus for a Key Management Scheme for Internet Protocols" (Ser. No. 08/258,272, filed Jun. 10, 1994) (hereinafter referred to as the "SKIP" scheme), a system was disclosed for providing a key management scheme particularly suited to connectionless datagram protocols, such as the Internet Protocol (IP). The SKIP scheme was disclosed as applied to the secure transfer of data between discrete computers coupled to private networks in communication over the Internet. Although using the teachings of SKIP the data transferred between nodes is secure, the system disclosed in the Applicant's copending Application still permitted an intruder ("a cracker") to detect the source and destination addresses of the communicating computers.

As will be described, the present invention utilizes the teachings of SKIP for securing traffic at the IP layer, which has advantages over performing security functions at the application or transport layers. The approach of the present invention is to encrypt inter-site traffic at the IP layer using the SKIP scheme, and thereby deny a would be cracker from detecting the source and destination addresses of the communicating nodes. To minimize the impact of providing key-management facilities in every node, the present invention encrypts the IP packets only from site firewall to site firewall. Thus, only the firewall servers need to participate in the SKIP scheme. When a firewall receives an IP packet from an interior site node intended for a remote firewall, it encrypts the IP packet and sends it encapsulated in another IP packet destined for the remote firewall. The remote firewall decrypts the encapsulated packet and sends it in the clear to the destination node on the interior side of the remote firewall.

Another common network security requirement is to allow remote users to access the protected network from across the Internet in a secure fashion. As will be described, the present invention accommodates this requirement on top of packet layer encryption, without requiring changes to the various client applications used for remote access across the Internet.

SUMMARY OF THE INVENTION

The present invention provides an improved application of the SKIP key management scheme for encryption of Internet Protocol (IP) data packets between site firewalls. The present invention includes a first data processing device (node I) coupled to a first private network and to a firewall server (FWA). Firewall server FWA is in turn coupled to a public network, such as the Internet. A second data processing device (node J) is coupled to a second private network which is coupled to the Internet through a firewall server (FWB). Node I provides a data packet including IP data and a destination address for the intended receiving computer node J, to firewall FWA. Firewall FWA is provided with a secret value a, and a public value $\alpha^a$ mod p. Similarly, firewall FWB is provided with a secret value b and a public value $\alpha^b$ mod p. The firewall FWA obtains a Diffie-Hellman (DH) certificate for firewall FWB and determines the public value $\alpha^b$ mod p from the DH certificate. Firewall FWA then computes the value of $\alpha^{ab}$ mod p, and derives a key $K_{ab}$ from the value $\alpha^{ab}$ mod p. A transient key $K_p$ is generated randomly and is configured for use with a predetermined number of data packets. $K_p$ is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA, and determines the public value of $\alpha^a$ mod p from the DH certificate. Firewall FWB computes the value of $\alpha^{ab}$ mod p, and derives the key $K_{ab}$. Firewall B utilizes the key $K_{ab}$ to decrypt the transient key $K_p$, and using the decrypted transient key $K_p$, firewall FWB decrypts the encrypted data packet received from FWA, thereby resulting in the recovery of the original dam sent by node I in unencrypted form to the firewall FWA. The firewall FWB then transmits the decrypted data packet to the receiving node J over the second private network. Accordingly, data packets sent within each of the private networks coupled are transmitted in an unencrypted form, however, all transmissions of data between firewalls over the Internet are encrypted using the teachings of the present invention prior to transmission. The present invention may also be used in conjunction with a remote user operating with dynamically assigned IP addresses. In the case of a mobile or remote user utilizing a public network address, only the IP data is encrypted utilizing the teachings of the present invention such that the public address and firewall destination addresses are sent in the clear over the Internet.

from firewall (FWA) in accordance with the teachings of the present invention.

Figure 7:
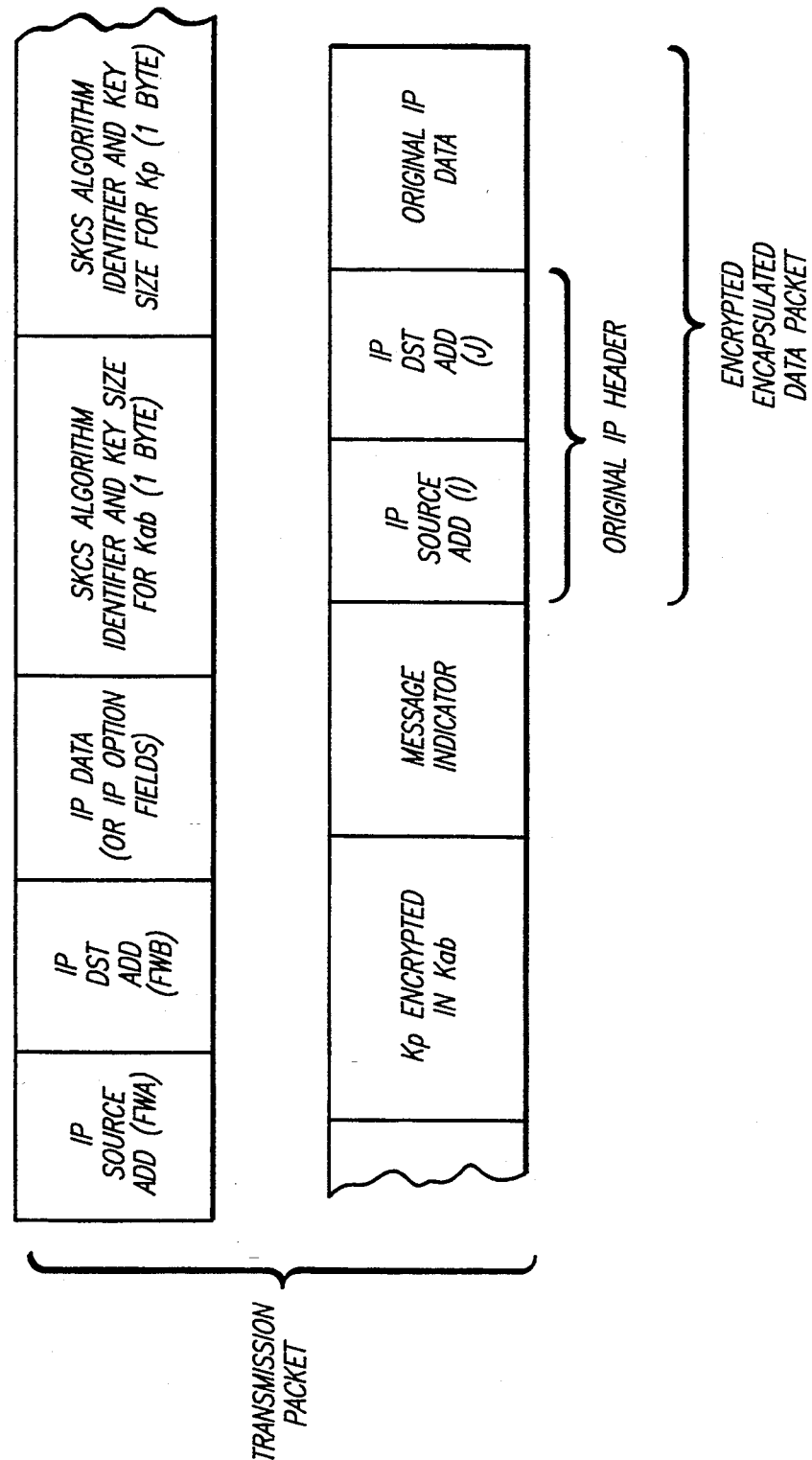

FIG. 7 conceptually illustrates a representative transmission packet including an encrypted encapsulated data packet sent between firewalls over the Internet in accordance with the teachings of the present invention.

Figure 8:
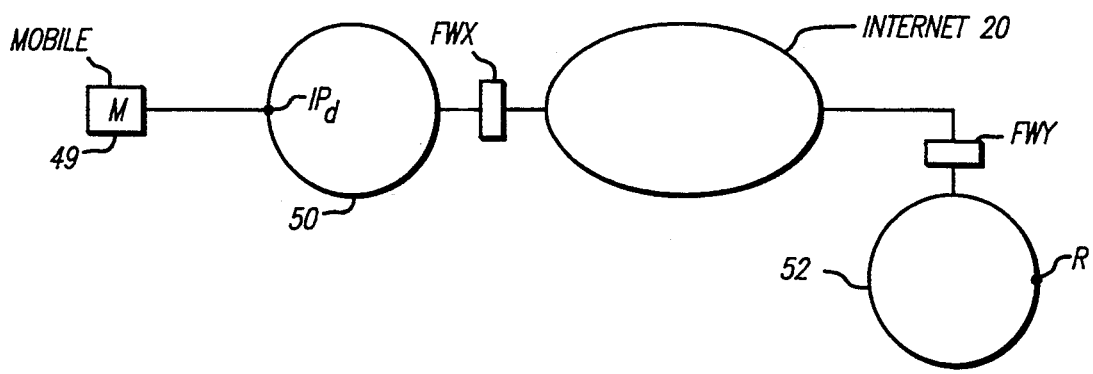

FIG. 8 diagrammatically illustrates one possible network scheme utilizing the teachings of the present invention in which a mobile data processing device is temporarily coupled for communication to a private network.

Figure 9:
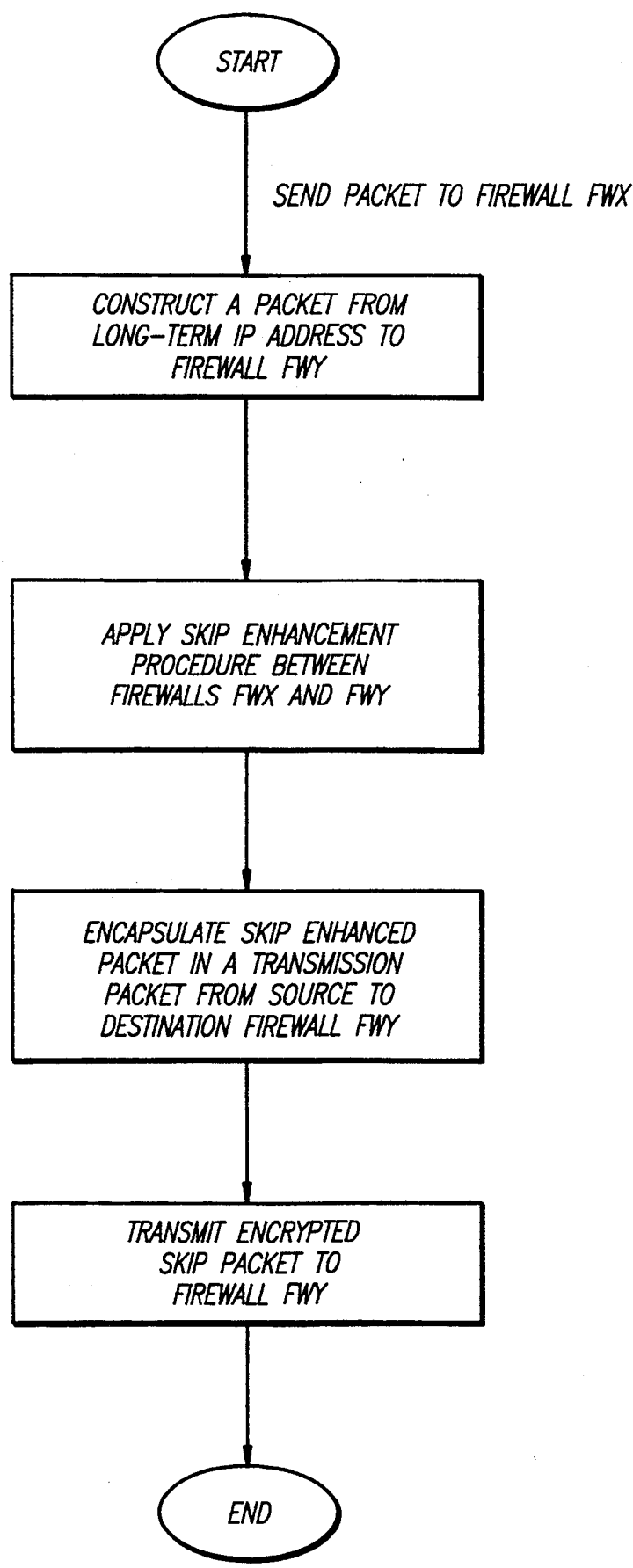

FIG. 9 is a flow chart illustrating the sequence of steps executed by a mobile data processing device with a dynamically assigned address.

Figure 10:
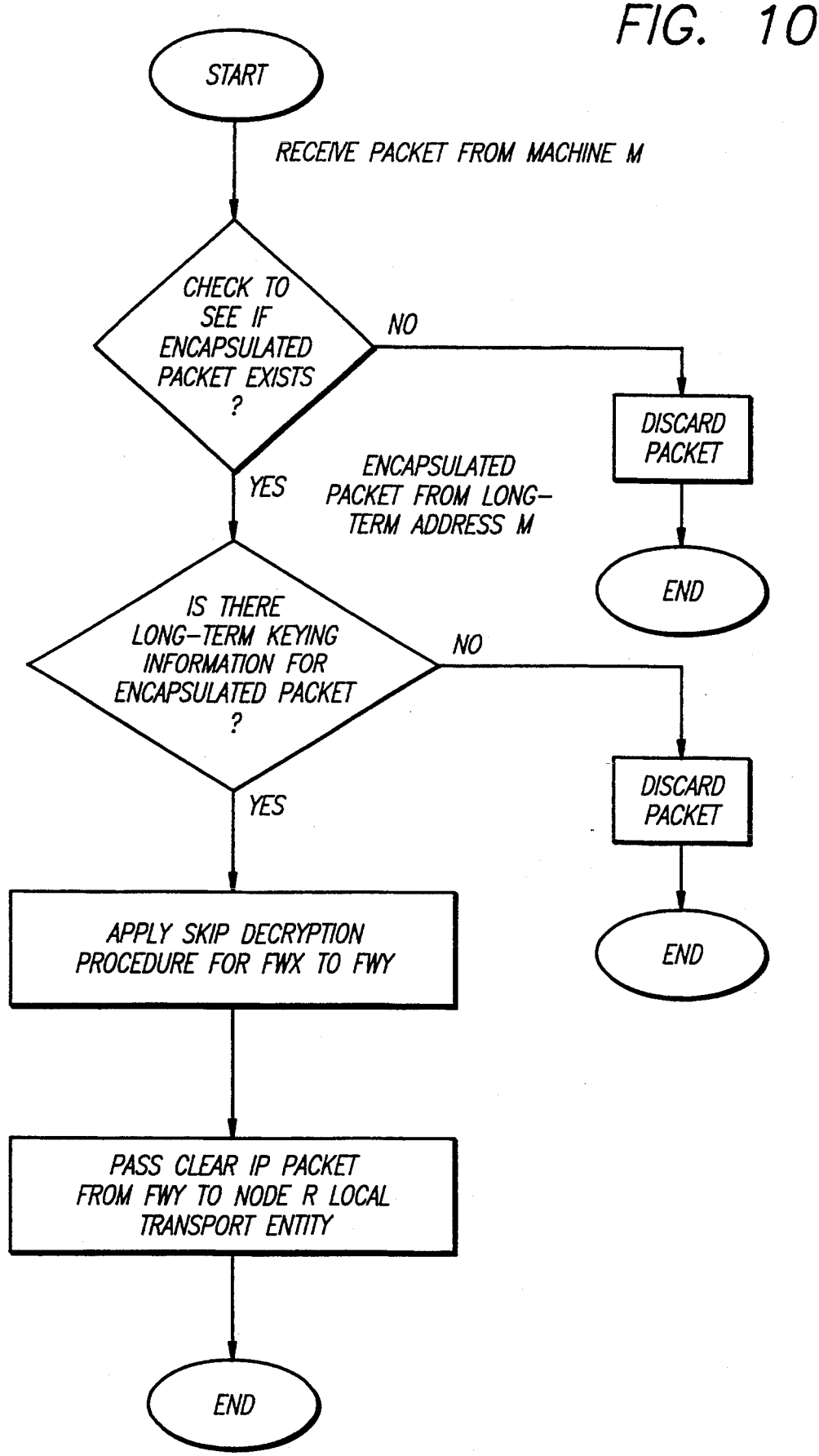

FIG. 10 is a flow chart illustrating the sequence of steps executed by a receiving firewall in the case of a mobile IP device utilizing dynamically assigned addressing.

Figure 11:
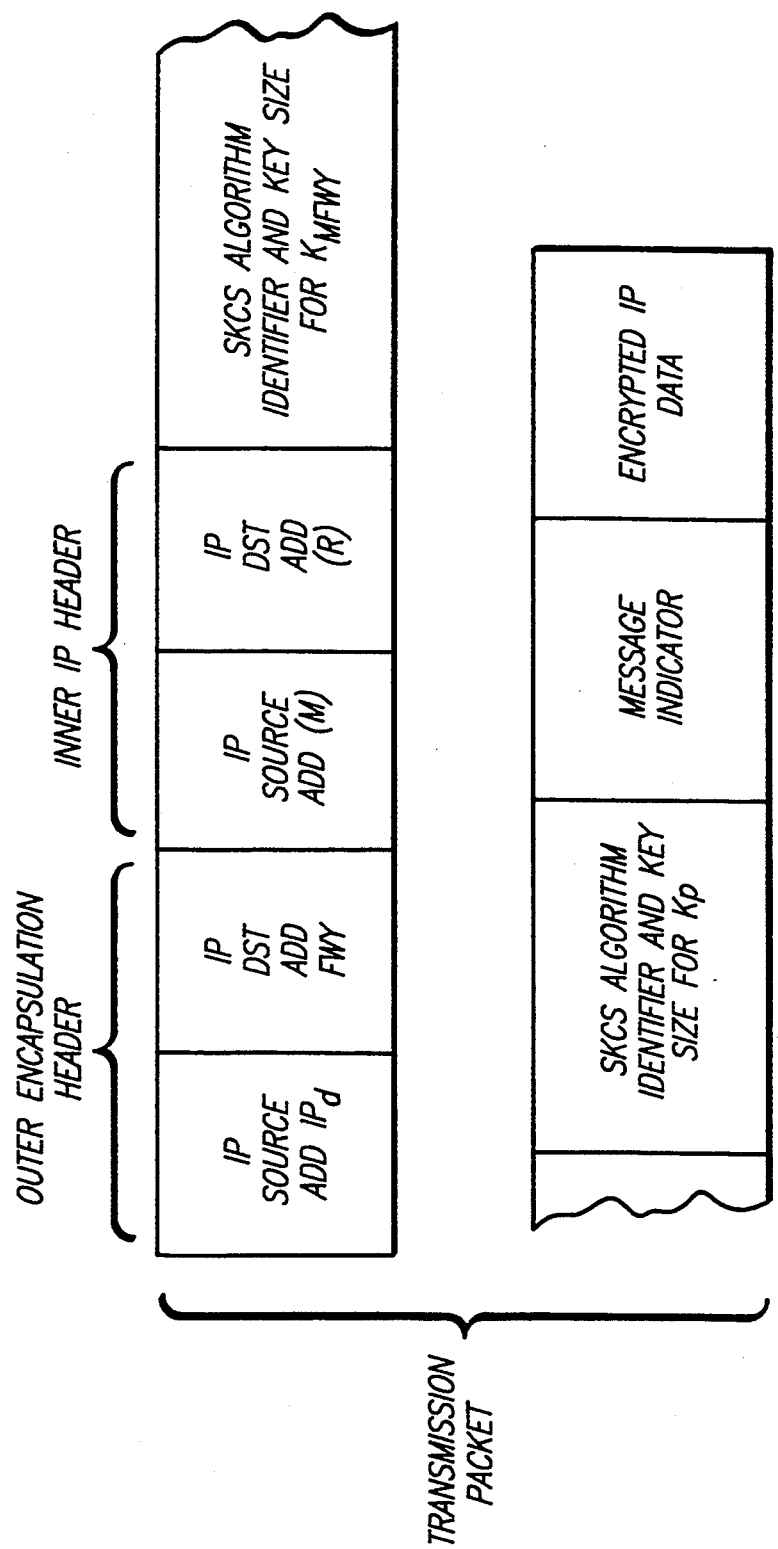

FIG. 11 conceptually illustrates a transmission packet and an encrypted encapsulated data packet in the case where a mobile data processing device communicates to distant nodes through firewalls coupled to the Internet.

NOTATION AND NOMENCLATURE

The detailed descriptions which follow are presented largely in terms of symbolic representations of operations of data processing devices coupled to a network. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind, however, that all of these similar terms are to be associated with the appropriate physical quantities and are merely convenient labels applied to these quantities.

In the present invention, the operations referred to are machine operations. Useful machines for performing the operations of the present invention include general purpose digital computers (referred herein as "nodes" and as "firewalls"), or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

This patent is related to the Applicant's co-pending U.S. patent application, Ser. No. 08/258,272, filed Jun. 10, 1994, entitled "Method and Apparatus for a Key Management Scheme for Internet Protocols" (referred to as the "SKIP scheme"), and fully incorporates this related application by reference herein.

In the following description, numerous specific details are set forth such as system and network configurations, representative data packets, messages, and devices, etc., to provide a thorough understanding of the present invention. However, it will be apparent to one skilled in the art that the present invention may be practiced without these specific details. In other instances, well known circuits and structures are not described in detail in order to not obscure the present invention. Moreover, certain terms such as "knows", "verifies", "examines", "utilizes", "finds", "understands", "determines", "challenges", "authenticates", etc., are used in this Specification and are considered to be terms of art. The use of these terms, which to a casual reader may be considered personifications of computer or electronic systems, refers to the functions of the system as having human-like attributes, for simplicity. For example, a reference herein to an electronic system as "determining" something is simply a shorthand method of describing that the electronic system has been programmed or otherwise modified in accordance with the teachings herein. The reader is cautioned not to confuse the functions described with everyday human attributes. These functions are machine functions in every sense.

Exemplary Hardware

Figure 1:
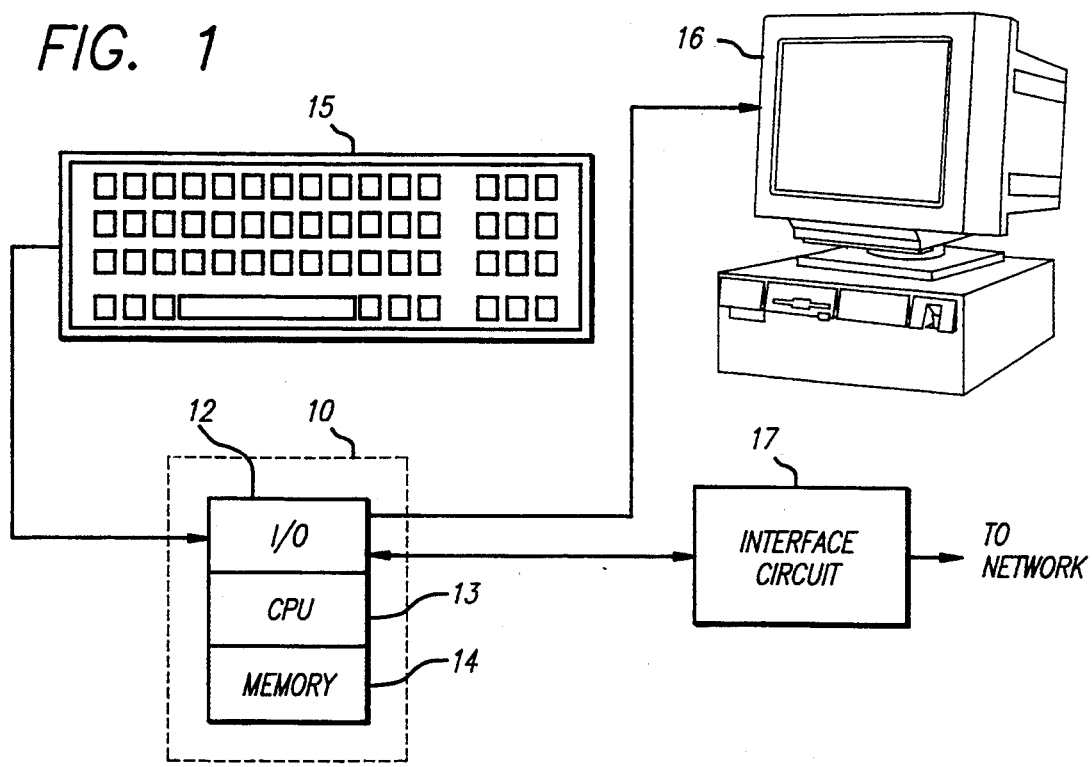
FIG. 1 illustrates a data processing system incorporating the teachings of the present invention.

FIG. 1 illustrates a data processing system in accordance with the teachings of the present invention. Shown is a computer 10, which comprises three major components. The first of these is an input/output (I/O) circuit 12 which is used to communicate information in appropriately structured form to and from other portions of the computer 10. In addition, computer 10 includes a central processing (CPU) 13 coupled to the I/O circuit 12 and a memory 14. These elements are those typically found in most general purpose computers and, in fact, computer 10 is intended to be representative of a broad category of data processing devices. Also shown is an interface circuit 17 coupled to the I/O circuit 12 for coupling the computer 10 to a network, in accordance with the teachings herein. The interface circuit 17 may include encrypting and decrypting circuitry incorporating the present invention in the case of a "firewall" server, or as will be appreciated, the present invention may also be implemented in software executed by computer 10. A raster display monitor 16 is shown coupled to the I/O circuit 12 and issued to display images generated by CPU 13 in accordance with the present invention. Any well known variety of cathode my tube (CRT) or other type of display may be utilized as display 16.

Figure 2:
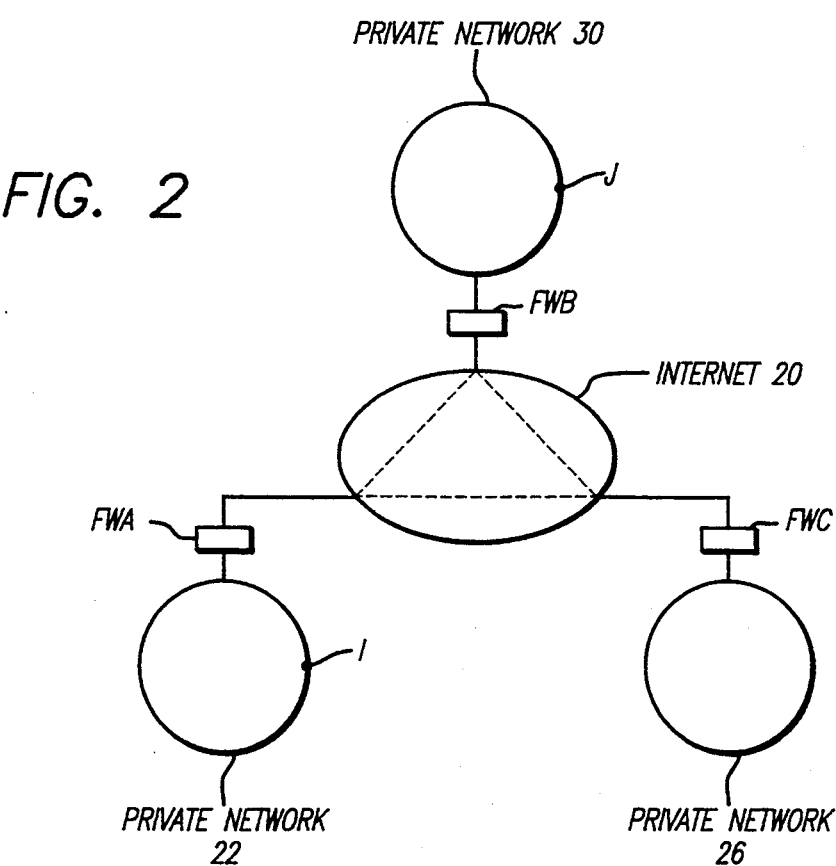
FIG. 2 diagrammatically illustrates one possible network scheme using the teachings of the invention in an Internet environment.

Referring now to FIG. 2, a simplified diagram conceptually illustrates the Internet 20 coupled to a private network 22 through a "firewall" server (FWA). A "firewall" server is a computer which couples the computers of a private network to the Internet 20, and may thus act as a gatekeeper for messages and data going to and from the Internet. A second private network 30 is also coupled for communication with the Internet 20 through a firewall server (FWB). A third private network 26 is coupled through a firewall server (FWC) to the Internet 20. The firewall servers are Internet protocol (IP) server computers which do not generally run application software, but rather encrypt and decrypt datagram traffic sent and received to nodes on the private networks over the Internet 20. The network topology illustrated in FIG. 2 is representative of one Internet topology, however, it will be noted that the present invention provides an improved key management scheme which has application for use in networks other than the Internet.

One of the unique aspects of the Internet system is that messages and data are transmitted through the use of data packets ("datagrams"). In a datagram-based network, messages are sent from a source to a destination in a similar manner to a government mail system. For example, a source computer may send a datagram packet to a destination computer regardless of whether or not the destination computer is currently on-line and coupled to the network. The Internet protocol (IP) is completely sessionless, such that IP datagram packets are not associated with one another.

In this Specification, the present invention is described with reference to communication between firewalls and between nodes. For example, a node I is coupled to private network 22 through the firewall (FWA). A node J coupled to the private network 30 communicates over the Internet through the firewall (FWB), as shown in FIG. 2. The nodes I and J, and the firewalls (FWA) and (FWB) represent computers, such as the computer illustrated in FIG. 1, coupled to their respective networks. For simplicity and ease of understanding, an operation by, for example, "node I" or firewall (FWA), shall be understood to mean an operation by the computer coupled to network 22.

Each firewall shown in FIG. 2 is configured to understand which firewall to send data packets to, given a destination IP address. This may be implemented by providing the firewalls with a map of all valid IP addresses disposed on its particular private network or at another location on the Internet. The map may be in the form of prefix matches, up to and including the full IP address.

Figure 3:
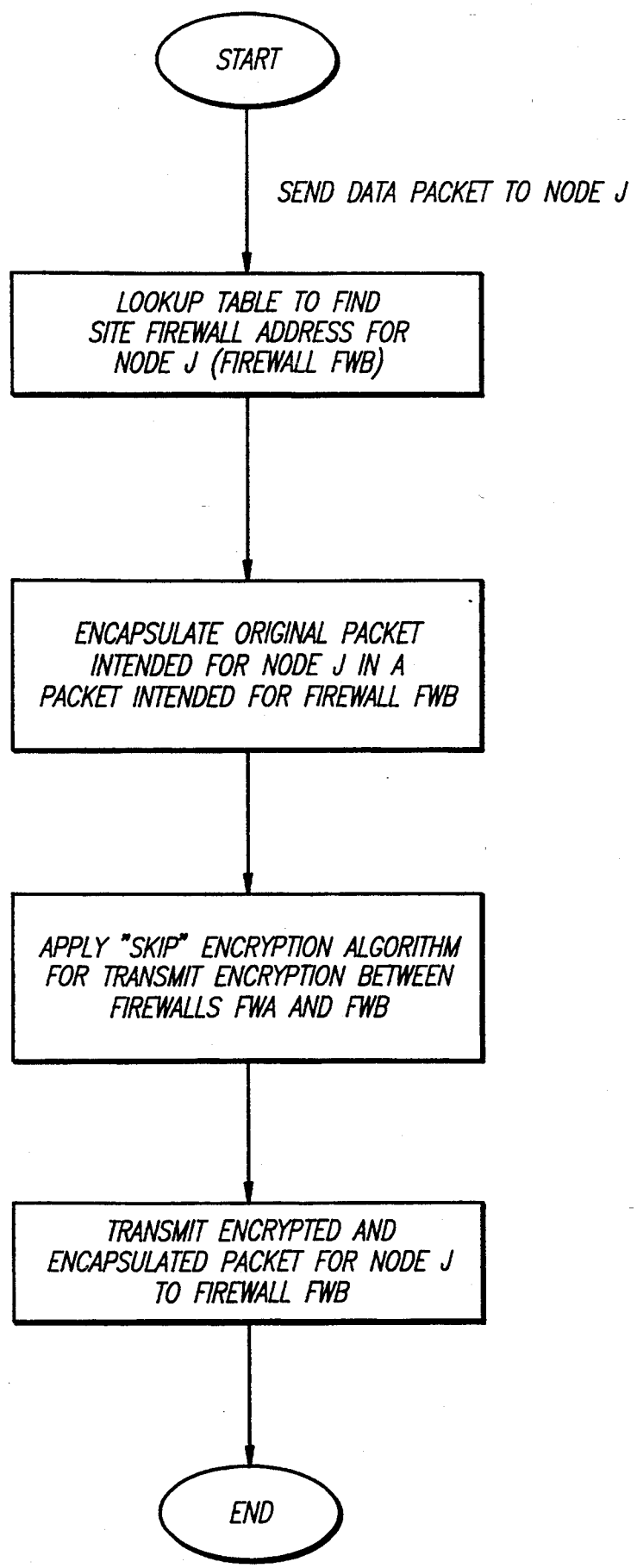
FIG. 3 is a flow chart illustrating an overview of the steps executed in sending an encrypted data packet between firewalls over the Internet.
Figure 4:
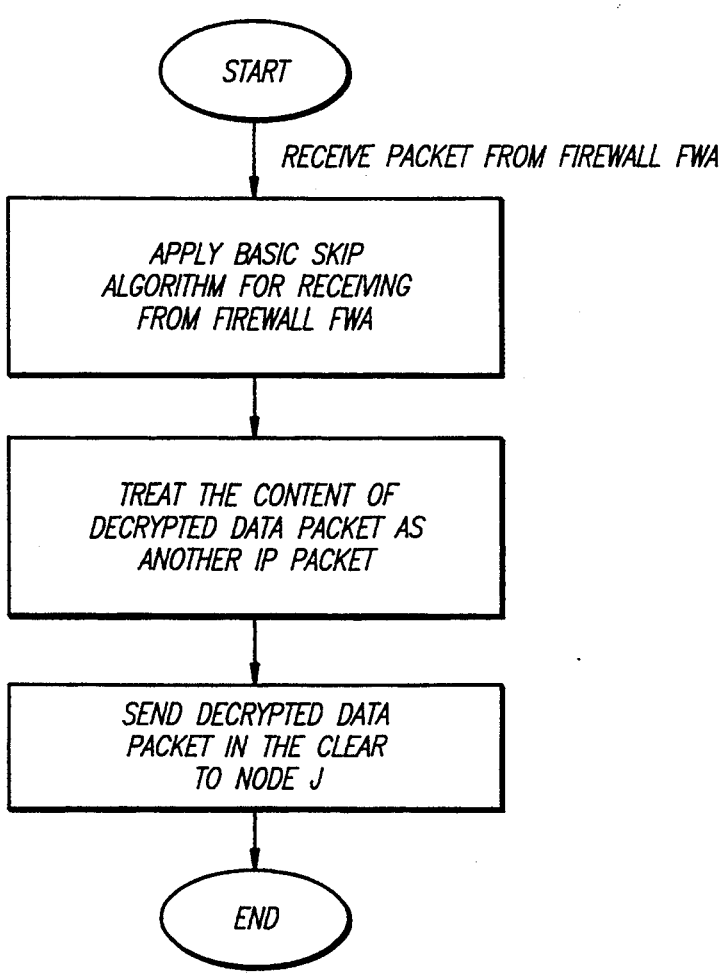
FIG. 4 is a flow chart illustrating an overview of the steps executed by a receiving firewall utilizing the teachings of the present invention.

Referring now generally to the flowcharts of FIGS. 3 and 4, utilizing the map a firewall determines whether a data packet is intended for a remote node across the public part of the Internet 20, and if that is the case, the firewall looks up the corresponding IP address of the remote firewall. For example, assume that a node I desires to send a data packet to a node J on private network 30. The firewall FWA first determines that node J is coupled to network 30, and that firewall FWB serves the network 30. Then the firewall FWB encapsulates the original IP data packet (header and data) and transmits the data packet in an encrypted IP packet intended for the remote firewall FWB. As will be described, the encryption is performed using the SKIP pair-wise packet encryption scheme, where the pair is the transmitting and receiving firewalls FWA and FWB. The receiving firewall (FWB) will execute the steps illustrated in FIG. 4 complete the corresponding SKIP decryption. The firewall FWB understands that it has received a tunneled IP packet, and then sends the decrypted data packet in the clear through the interior of the private network 30 to the node J.

The rationale of the present invention for performing secure tunneling, (encapsulating the entire original IP packet), as opposed to simply encrypting the data portion of the IP packet while leaving the original header intact, is that the encryption of the entire IP packet prevents the topology and the number of nodes in the interior network to be discovered by a cracker. All a cracker can determine is that there are certain number of firewalls that communicate with each other. No information about which nodes in the interior networks are communicating on an end-to-end basis, or how many nodes exist in the interior of the private networks is divulged to outside observers.

As noted in the Applicant's co-pending Application describing SKIP, the use of Diffie-Hellman (DH) public-key certificates can avoid the pseudo session state establishment, and the communications requirement between the two communicating computers to acquire and change packet encrypting keys. (See, W. Diffie, M. Hellman, "New Directions in Cryptography", IEEE Transactions on Information Theory). Furthermore, the use of a DH public-key certificate does not incur the overhead of carrying 64–128 bytes of keying information in every packet, and is better suited to protocols like IP, since it does not require the receiving computer to be operational to establish and change packet encrypting keys.

Figure 5:
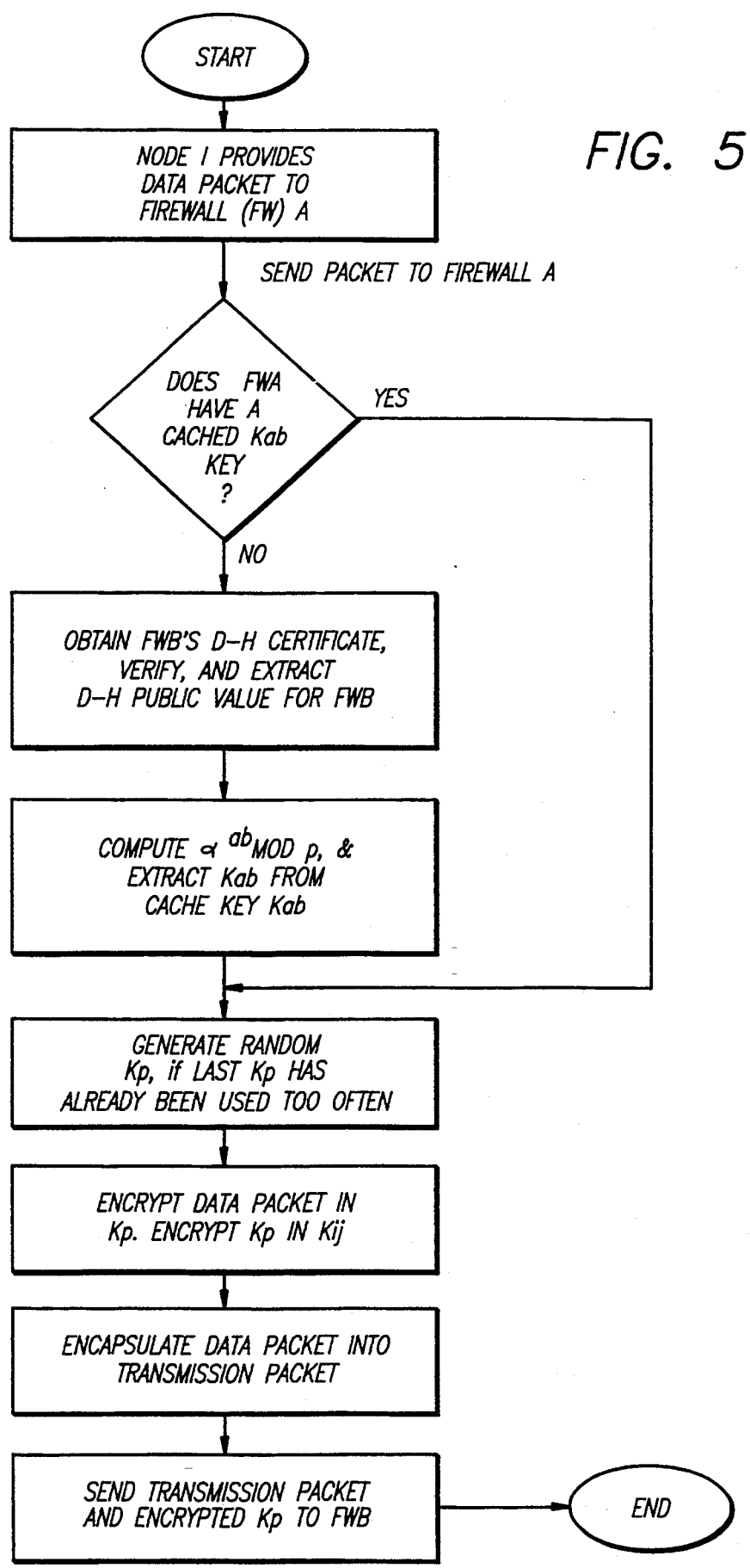
FIG. 5 illustrates a flow chart of the steps executed in sending an encrypted dam packet from a firewall (FWA) to a firewall (FWB) over the Internet, in accordance with the teachings of the present invention.
Figure 6:
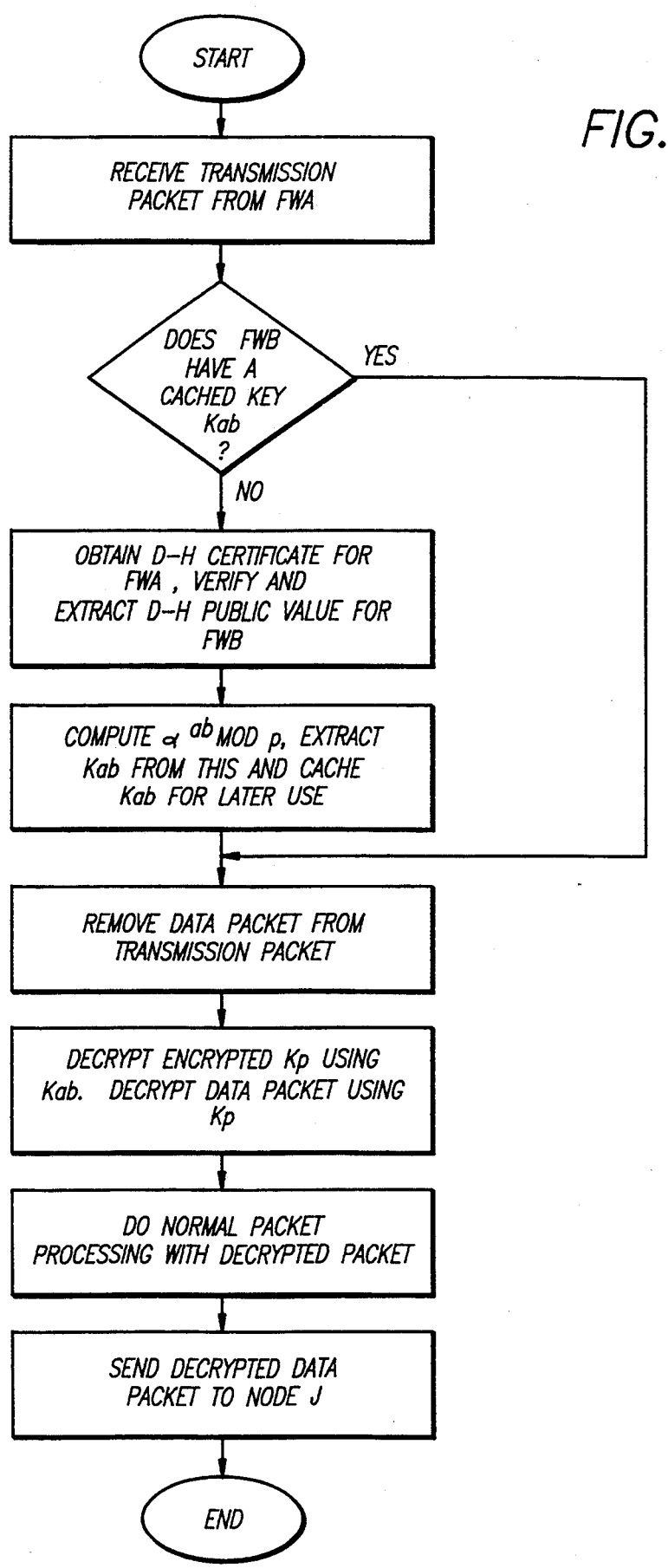
FIG. 6 is a flow chart of the steps executed for the receipt of encrypted data packets by firewall (FWB)

Referring now to the flow charts illustrated in FIGS. 5 and 6, the SKIP protocol is described utilizing DH public-key certificates for key management, such that each IP source and destination firewall is provided with a Diffie-Hellman public key. This DH public-key is distributed in the form of a certificate. The certificate can be signed using either an RSA or DSA signature algorithm. The certificate is referred to herein as a "Diffie-Hellman" (DH) certificate, because the public value that is certified is a Diffie-Hellman public value.

The reader is referred to the flow charts of FIGS. 5 and 6, for the derailed steps executed by the sending and receiving firewalls, and to the more general overview flow charts of FIGS. 3 and 4. In this Specification, for purposes of illustration, the present invention is described with reference to node I sending a datagram packet to node J, shown in FIG. 2. It will be appreciated that the selection of node I as a source node and node J as a receiving node is arbitrary. In actuality, both nodes can send and receive datagrams, and there are many nodes coupled to numerous private networks in communication over the Internet 20.

The present invention begins with the source node I sending a datagram in unencrypted form over private network 22 to the firewall FWA. Upon initialization IP source firewall FWA is provided with a secret value a, and computes a public value $\alpha^a \bmod p$. Similarly, firewall FWB is provided with a secret value b, and computes a public value $\alpha^b \bmod p$. For purposes of illustration, assume that node I wishes to communicate with a node J coupled to private network 30. Both firewalls FWA and FWB can acquire a shared secret $\alpha^{ab} \bmod p$ without having to communicate, so long as the public key of each IP firewall is known to all the other IP firewalls. The values $\alpha$ and p are system parameters, where p is a prime number.

The computable shared secret may be used as a key-encrypting key to provide for IP packet based authentication and encryption. Thus, the value $\alpha^{ab} \bmod p$ is denoted as the "long-term key", from which a key $K_{ab}$ is derived. The key $K_{ab}$ is used as the key for a known shared-key cryptosystem (SKCS) like DES or RC2. It will also be noted that $K_{ab}$ is an implicit pair-wise shared secret. $K_{ab}$ need not be sent in every packet or negotiated out-of-band. Simply by examining the source of an IP packet, the destination IP firewall (for example, FWA) can compute the shared secret $K_{ab}$.

The key $K_{ab}$ is derived from $\alpha^{ab} \mod p$ by using the low order key-size bits of $\alpha^{ab} \mod p$. Since $\alpha^{ab} \mod p$ is minimally at least 512 bits (and for greater security may be 1024 bits or higher), sufficient bits may be derived for use as $K_{ab}$ which is used as a key for the SKCS. Typically, SKCS key sizes are in the range of 40–172 bits.

As illustrated in the flow charts of FIGS. 5 and 6, the SKIP protocol then utilizes the key $K_{ab}$ to encrypt a "transient key" which is referred to as $K_p$. The transient key $K_p$ is a randomly generated value which is configurable for use with a predefined number of bytes. Once the key $K_p$ has been used for the predefined number of bytes, the key $K_p$ is changed to enhance security. The encrypted transient key $K_p$ is used to encrypt the received data packet from node I, or a collection of IP data packets. The encryption using $K_p$ limits the amount of data in the long-term key which a potential cracker can access. Since it is desirable to retain the long-term key for a relatively long period of time (one or two years), the actual IP data is not encrypted in key $K_{ab}$. In the preferred embodiment of the invention, only the transient keys of the long-term key are encrypted using $K_{ab}$, and the transient keys are used to encrypt IP data traffic. Thus, the amount of data encrypted in the long-term key ($K_{ab}$) is limited to a relatively small amount over a long period of time.

The first time the IP firewall, such as firewall FWA, which has been provided with the secret value a, communicates with the firewall FWB which has been provided with a secret value b, the firewall FWA computes the shared secret $\alpha^{ab} \mod p$. The firewall FWA can then cache this shared secret as the long-term key $K_{ab}$. FWA then generates a random key $K_p$ and encrypts this key using $K_{ab}$. As illustrated in flow chart of FIG. 3, FWA encrypts the IP packet in key $K_p$ including the original IP header and data. The firewall FWA then encapsulates the encrypted IP packet in a transmission packet of the form illustrated in FIG. 7. The outer IP header of the transmission packet specifies the protocol type for the contents of the outer header. The firewall FWA then transmits the transmission packet over the Internet 20 to the receiving firewall FWB.

It will be appreciated that to prepare the transmission packet illustrated in FIG. 7 for transmission on the outbound side of FWA, no communication was necessary with the receiving firewall FWB. In addition, since $K_{ab}$ is used as the key for the SKCS, the length of the encrypted key $K_p$ is the block size of a shared-key cipher (typically 8 bytes), as opposed to the block size of a public-key cipher (typically 64–128 bytes), which would have been the case if RSA certificates had been used in conjunction with in-band signalling of the packet encryption key.

As shown in FIG. 6, when firewall FWB receives the transmission packet, FWB also computes the shared secret $K_{ab}$ and caches it for later use. Using $K_{ab}$ it obtains $K_p$. Firewall FWB removes the encrypted data packet from the transmission packet and decrypts the encrypted data, which it then delivers to the appropriate local transport entity in private network 30 for delivery to node J.

The Message Indicator (MI) shown in FIG. 7 is a field that is used to preserve the statelessness of the protocol of the present invention. If a single key is used to encrypt multiple packets, (which is highly desirable since changing the key on a per packet basis constitutes significant computational overhead) then the packets need to be decryptable regardless of lost or out-of-order packets. The MI field serves this purpose. The actual content of the MI field is dependent on the choice of SKCS used for $K_p$ and its operating mode. For example, if $K_p$ refers to a block cipher (e.g. DES) operating in Cipher-Block-Chaining (CBC) mode, then the MI for the first packet encrypted in key $K_p$ is the Initialization Vector (IV). For subsequent packets, the MI is the last blocksize-bits of ciphertext of the last (in transmit order) packet. For DES or RC2 this would be 64 bits. For stream ciphers like RC4, the MI is simply the count of bytes that have already been encrypted in key $K_p$ (and may also be 64 bits).

If the firewall FWA decides to change the packet encryption key $K_p$, the receiving firewall FWB can discover this fact without having to perform a public-key operation. The receiving firewall FWB uses the cached value $K_{ab}$ to decrypt the encrypted packet key $K_p$, and this is a shared-key cryptosystem operation. Thus, without requiring communication between transmitting (FWA) and receiving (FWB) ends, and without necessitating the use of a public-key operation, the packet encrypting key can be changed by the transmitting side.

Since DH certificates are used, the firewalls FWA and FWB have no public-key signature algorithm. It will be appreciated that the lack of a public-key signature algorithm is not a major issue, since signing each packet using a public-key cryptosystem is too cumbersome in any case. In accordance with the present invention, the integrity of the packets is determined in a pair-wise fashion using a SKCS.

In order to retain the amount of data encrypted in any given key to be less than $2^{32}$ (assuming a 64-bit block cipher) at T1 speeds of 1.5 Mbits/sec, the packet encryption key must change roughly every six hours. This results in the amount of key material encrypted in the long-term key in a year to be roughly 24K bytes, well under the $2^{32}$ limit that would necessitate changing the long-term key more frequently than once a year.

Since the $K_{ab}$ values need to be cached for efficiency, reasonable safeguards need to be taken to protect these keys. One possible way to accomplish caching is to provide a hardware device to compute, store and perform operations using these keys. This device can ensure that there are no interfaces to extract the key from the device. It is contemplated that such a hardware device may be incorporated within the CPU block 13 illustrated in FIG. 1.

Moreover, since the public DH values are communicated in the form of certificates, the same type of multi-tier certification structure that is being deployed for Privacy Enhanced Mail ("PEM"), and also by the European PASSWORD project may be employed. There may be a Top Level Certifying Authority (TLCA) which may constitute the Internet Policy Registration Authority (IPRA), Policy Certifying Authorities (PCAs) at the second tier and the organizational Certificate Authorities (CAs) below that.

In addition to the identity certificates, which are part of PEM, additional authorization certificates are needed to properly track the ownership of IP addresses. Since it is desirable to directly use IP addresses in the DH certificates, name subordination principles alone cannot be used to determine if a particular CA has the authority to bind a particular IP address to a DH public key. However, the present invention may use the X.509/PEM certificate format, since the subject Distinguished Name (DN) in the certificate can be the ASCII decimal representation of an IP (or IPng) address.

Since the firewalls only have DH public keys, which have no signature capability, the firewalls themselves are unable to issue DH certificates. The firewall certificates are issued by organizational CAs which have jurisdiction over the range of IP addresses that are being certified. The PCAs will have to perform suitable checks (in line with the policy of that PCA), to confirm that the organization which has jurisdiction over a range of addresses is issued a certificate giving it the authority to certify the DH values of individual firewalls with those addresses. This authority may be delegated in the form of a authorization certificate signed by the PCA. For the purposes of authorization, the CA's Distinguished Name (DN) will be bound to the range of IP addresses over which it has jurisdiction. The CA has either an RSA or DSA certificate from the PCA. The CA which has authority over a range of IP addresses can delegate authority over part of the range to a subordinate CA, by signing another authorization certificate using its own private key. The organizational CA so authorized is identified by the range of addresses that it can issue certificates for. The range of IP addresses are identified in the certificate in the form of a IP address prefix.

However, since only the firewall machines participate in the key management protocol of the present invention, there is a relatively small number of certificates that need to be managed. This is an advantage over the basic SKIP protocol as disclosed in the Applicant's co-pending application. For an organization simply communicating with its various subsidiaries over the Internet 20, the DH certificates may be signed by a few Certification Authorities (CAs) operated by the various sites. There can be as few as one CA per site for this purpose, or even one CA for the entire collection of sites.

User Authentication

The present invention is also described with reference to remote user authentication. The first remote user authentication application described herein is for the case where a user has a known IP address (and hence an assignable DH certificate). For example, when a user connects to an application or transport layer relay at a firewall machine, such as FWA, the application or transport layer relay creates an unsecured connection to the interior of the private network 22. The relay performs the user authentication. If we assume that the application supports password based authentication, which is true for most of the existing applications such as ftp, telnet, etc., then layering the password on top of an encrypted datagram substrate provides for strong user authentication, as described more fully below.

In accordance with the present invention, the login prompt is allowed to contain a randomly generated alphanumeric string. This random string is displayed in the clear to the user. The user enters the string in the password field, as well as his/her long-term password. The receiving computer checks to see if the string is properly present in the password field, and obtains the rest of the user password. This password is then checked using the regular password verification mechanism.

The present invention's authentication scheme has the following advantages. The password is only sent encrypted over the Internet, since it is going in an unencrypted datagram from the remote node (I) to the firewall machine (FWA). By providing a random string in the login prompt, the user must enter a new string along with his/her password on every log-in attempt. This requirement effectively eliminates the possibility of encrypted datagram playback attacks. The password is used to provide user authentication, so even if a properly configured IP host is acquired by an intruder, the intruder cannot connect to a firewall machine without first entering a valid password.

It will be appreciated that the client application is simply given a login prompt, and the user is then asked to provide a response, similar to the client applications currently in place. This feature is a major advantage over the prior art, because by acting on the IP layer, the existing applications can automatically benefit, without having to modify software on a per client application basis. Furthermore, since all the IP packets are encrypted over the Internet, a variety of attacks, both passive and active are prevented, providing for a very high level of security, without necessitating modifications to the existing myriad client applications. Since the present invention is executed by firewalls, the only computers that need to implement the IP layer key-management scheme are the firewall machines. All the interior machines, such as nodes I and J in FIG. 2, may continue to run the existing software.

Remote User Operating with Dynamically Assigned IP Address

Referring now to FIGS. 8 through 11, the present invention will be described with reference to the case where IP addresses are dynamically assigned. In the previous section, it was assumed that the user was utilizing a known IP address. In other words, the IP address and its corresponding DH certificate can be made known to a particular firewall machine in advance. This would be the case if the user's computer uses a remote dial-up style link, or some other fixed topology scenario. This would also be the case if the user's computer uses one of the several mobile IP protocols which allow the machine to move around, and yet retain its IP address. (See, copending patent application entitled "A Scalable and Efficient Intra-Domain Tunneling Mobile-IP Scheme", Ser. No. 08/128,838, filed Sep. 29, 1993, and assigned to the Assignee of this patent, Sun Microsystems, Inc.).

However, if the user is carrying a portable computer and connects to a public network facility where the computer is dynamically assigned an IP address using a protocol such as the Dynamic Host Configuration Protocol (DHCP), the user's IP address is not known. In such event, the present invention utilizes a tunneling scheme in which instead of having cryptographic credentials associated with the outer IP address, the cryptographic credentials are associated with the inner IP address.

Referring now to FIG. 8, there is shown an illustration of a mobile computer 49 ("mobile") having a long term IP address M, coupled to a network 50 at a temporary IP address $IP_d$. As illustrated, the network 50 is coupled to communicate over the Internet 20 through a firewall (FWX). Moreover, a second private network 52 is coupled to Internet 20 through a firewall (FWY). Assume, for purposes of explanation, that the mobile machine wishes to communicate with node R on the network 52, using the teachings of the present invention previously described with reference to FIGS. 3 through 7.

As shown in FIG. 9, the mobile computer 49 prepares an outgoing (unencrypted) data packet as if the source IP address was the long-term IP address M, and so is configurable for cryptographic credentials and remote access. The remote machine 49 sends this data packet to the firewall FWX over network 50.

As provided in FIG. 10, the firewall FWX receives the data packet and encrypts the IP data using the SKIP method described with reference to FIGS. 3 through 7. The encrypted IP packet is encapsulated in a transmission packet using the source IP address as the dynamically assigned $IP_d$ address. The destination address is the address of the destination firewall (FWY). The form of the transmission packet and the encrypted encapsulated data packet is illustrated in FIG. 11. Both the outer and inner IP header specifies an appropriate protocol type field for proper encapsulation and encryption processing. As provided in the flow chart of FIG. 10, the firewall FWY receives the encapsulated IP packet and decrypts it using the SKIP scheme. The firewall FWY passes the decrypted data packet to the local transport entity of private network 52 in the clear to the destination node R.

The firewall FWY performs the same type of tunneling to send a data packet back to the mobile computer 49 with the dynamically assigned address. As will be appreciated, the node R first prepares an IP data packet intended for the long-term IP address (M), and forwards this packet to firewall FWY. The firewall FWY encrypts the data packet using SKIP, and encapsulates the data packet into a transmission packet intended for the transient dynamically assigned IP address ($IP_d$). The transient mapping between the long-term IP address (M) and the short term IP address ($IP_d$) by the firewall FWY lasts for the duration of the TCP connection that caused this binding.

Since in this Specification it is assumed there exists transport or application layer relaying, only the firewall FWY must be capable of handling this kind of tunneling. Moreover, the present invention may operate in the absence of firewall application or transport layer relaying, as long as the end machines implement the present invention's protocol.

Summary

As described in this Specification, using the SKIP scheme the present invention provides an encrypted IP layer between firewalls. As a result of the security features of the present invention at the IP layer, security may be implemented either end-to-end (as is the case for user authentication) or it may be achieved at some appropriate middle points (e.g., between site-to-site firewalls). Moreover, the present invention has described a scheme for performing site-to-site encryptions where the only data which is sent in the clear world is the number of firewalls in the network. The present invention has also described two cases where user authentication is performed. The first is the case where the IP address is known in advance and changes infrequently. The other is the case of portable computers acquiring IP addresses dynamically. Both of these cases can accommodate user authentication, where the latter case involves a particular type of tunneling described by the present invention.

Although the present invention has been described with reference to a few exemplary FIGS. 1–11, it will be apparent that many alternatives, modifications and variations may be made in light of the foregoing description.

I claim:

1. In a network including a first data processing device node I coupled to a first firewall server FWA and a second data processing device node J coupled to a second firewall server FWB, said first and second firewall servers disposed between said respective nodes I and J and said network, an improved method for sending data from said node I to said node J, comprising the steps of:

providing an element for performing the step of said node I sending a data packet, including data and a destination address for node J, to said FWA;

providing an element for performing the step of providing a secret value a, and a public value $\alpha^a$ mod p to said FWA;

providing an element for performing the step of providing a secret value b, and a public value $\alpha^b$ mod p to said FWB;

said FWA performing the steps of:

adapting FWA for obtaining a Diffie-Hellman DH certificate for FWB and determining said public value $\alpha^b$ mod p from said DH certificate;

said firewall FWA computing the value of $\alpha^{ab}$ mod p, said FWA further deriving a key $K_{ab}$ from said value $\alpha^{ab}$ mod p;

said firewall FWA utilizing said key $K_{ab}$ to encrypt a randomly generated transient key $K_p$, and encrypting said data packet to be transmitted to FWB using said key $K_p$, said encrypted data packet being encapsulated in a transmission packet including an unencrypted destination address for FWB;

said FWA sending said transmission packet to said FWB.

2. The method as defined by claim 1, further comprising the steps by said FWB of:

providing an element for performing the step of receiving said transmission packet from FWA and decapsulating said data packet from said transmission packet;

providing an element for performing the step of obtaining a DH certificate for said FWA and determining said public value $\alpha^a$ mod p from said DH certificate;

providing an element for performing the step of computing the value of $\alpha^{ab}$ mod p, said FWB further deriving said key $K_{ab}$ from said value $\alpha^{ab}$ mod p;

providing an element for performing the step of utilizing said key $K_{ab}$ to decrypt said transient key $K_p$, and decrypting said received encrypted data packet using said transient key $K_p$;

providing an element for performing the step of sending said decrypted data packet to said node J;

whereby FWB decrypts data received and previously encrypted by FWA, and sends said decrypted data to said node J.

3. The method as defined by claim 2, wherein said FWB sends said received data packet to said node J using said decrypted destination address in said decrypted data packet.

4. The method as defined by claim 3, wherein said key $K_{ab}$ is derived from $\alpha^{ab}$ mod p using low order bits of $\alpha^{ab}$ mod p.

5. The method as defined by claim 4, wherein the key $K_{ab}$ is an implicit pair wise secret used as a key for a shared key cryptosystem SKCS.

6. The method as defined by claim 5, wherein $\alpha$ and p are system parameters, and where p is a prime number.

7. The method as defined by claim 6, wherein said data packet further includes a password.

8. The method as defined by claim 7, wherein said password includes a random number.

9. The method as defined by claim 8, wherein said transmission packet further includes a source address identifying the source of said transmission packet as FWA, and an SKCS identifier field.

10. The method as defined by claim 9, wherein said transmission packet further includes a message indicator field.

11. A network including a first data processing device node I coupled to a first firewall server FWA and a second data processing device node J coupled to a second firewall server FWB, said first and second firewall servers disposed between said respective nodes I and J and said network, comprising:

node I including a transmission device for sending a data packet, having data and a destination address for node J, to said FWA;

FWA including a first storage device for storing a secret value a, and a public value $\alpha^a$ mod p;

FWB including a second storage device for storing a secret value b, and a public value $\alpha^b$ mod p;

FWA including an encrypting device for encrypting said data packet to be transmitted to FWB, said dam packet being encrypted by using a first Diffie-Hellman DH certificate for FWB to determine said public value $\alpha^b$ mod p, and said encrypting device further computing the value of $\alpha^{ab}$ mod p and deriving a key $K_{ab}$ from said value $\alpha^{ab}$ mod p;

said encrypting device encrypting a randomly generated transient key $K_p$ from $K_{ab}$, and encrypting said data packet using said transient key $K_p$;

said encrypted data packet being encapsulated in a transmission packet, said transmission packet including an unencrypted destination address for FWB;

FWA further including an interface circuit for transmitting said transmission packet to said FWB over said network.

12. The network as defined by claim 11, wherein said FWB further includes:

a receiver for receiving said transmission packet from FWA and decapsulating said dam packet from said transmission packet; and a decrypting device coupled to said receiver for decrypting said data packet.

13. The network as defined by claim 12, wherein said decrypting device obtains a second DH certificate for said FWA and determines said public value $\alpha^a$ mod p, and computes the value of $\alpha^{ab}$ mod p, said decrypting device further deriving said key $K_{ab}$ from $\alpha^{ab}$ mod p.

14. The network as defined by claim 13, wherein said decrypting device utilizes said key $K_{ab}$ to decrypt said transient key $K_p$, and decrypts said data packet using said transient key $K_p$.

15. The network as defined by claim 14, wherein said key $K_{ab}$ is derived from $\alpha^{ab}$ mod p using low order bits of $\alpha^{ab}$ mod p.

16. The network as defined by claim 15, wherein said key $K_{ab}$ an implicit pair wise secret used as a key for a shared key cryptosystem SKCS.

17. The network as defined by claim 16, wherein said transmission packet includes a source address identifying the source of said transmission packet as FWA, and an SKCS identifier field.

18. The network as defined by claim 17, wherein said transmission packet further includes a message indicator field.

19. The network as defined by claim 18, wherein $\alpha$ and p are system parameters, and where p is a prime number.

20. In a network including a mobile data processing device M having a long term address M and a temporary address $IP_d$, said device M coupled to a first firewall server FWX, and a second data processing device R coupled to a second firewall server FWY, said first and second firewall servers disposed between said respective devices M and R, an improved method for sending data from said device M to said device R, comprising the steps of:

said device M sending a data packet, including data, a destination address for device R, and said long term address M to said firewall FWX;

providing a secret value x, and a public value $\alpha^x$ mod p to said FWX;

providing a secret value y, and a public value $\alpha^y$ mod p to said FWY; said FWX performing the steps of:

obtaining a Diffie-Hellman DH certificate for FWY and determining said public value $\alpha^y$ mod p from said DH certificate;

computing the value of $\alpha^{xy}$ mod p, said FWX further deriving a key $K_{xy}$ from said value $\alpha^{xy}$ mod p;

utilizing said key $K_{xy}$ to encrypt a randomly generated transient key $K_p$, and encrypting said data packet to be transmitted to FWY using said key $K_p$, said encrypted data packet being encapsulated in a transmission packet including an unencrypted destination address for FWY and said temporary address $IP_d$ as a source address;

said FWX sending said transmission packet to said FWY.

21. The method as defined by claim 20, further comprising the steps by said FWY of:

receiving said transmission packet from FWX and decapsulating said data packet from said transmission packet;

obtaining a DH certificate for said FWX and determining said public value $\alpha^x$ mod p from said DH certificate;

computing the value of $\alpha^{xy}$ mod p, said FWY further deriving said key $K_{xy}$ from said value $\alpha^{xy}$ mod p;

utilizing said key $K_{xy}$ to decrypt said transient key $K_p$, and decrypting said received encrypted data packet using said transient key $K_p$;

sending said decrypted data packet to said device R;

whereby FWY decrypts data received and previously encrypted by FWX, and sends said decrypted data to said device R.

22. The method as defined by claim 21, wherein said key $K_{xy}$ is derived from $\alpha^{xy}$ mod p using low order bits of $\alpha^{xy}$ mod p.

23. The method as defined by claim 22, wherein the key $K_{xy}$ is an implicit pair wise secret used as a key for a shared key cryptosystem SKCS.

24. The method as defined by claim 23, wherein $\alpha$ and p are system parameters, and where p is a prime number.

25. The method as defined by claim 24, wherein said transmission packet further includes an SKCS identifier field.

26. A network including a mobile data processing device M having a long term address M and a temporary address on said network $IP_d$, said device M coupled to a first firewall server FWX and a second data processing device R coupled to a second firewall server FWY, said first and second firewall servers disposed between said respective devices M and R, comprising:
   device M including a transmission device for sending a data packet, including data, and a destination address for device R, and said long term address M to said firewall FWX;
   FWX including a first storage device for storing a secret value x, and a public value $\alpha^x$ mod p;
   FWY including a second storage device for storing a secret value y, and a public value $\alpha^y$ mod p;
   FWX including an encrypting device for encrypting said data packet to be transmitted to FWY, said data packet being encrypted by using a first Diffie-Hellman, DH, certificate for FWY to determine said public value $\alpha^y$ mod p, and said encrypting device further computing the value of $\alpha^{xy}$ mod p and deriving a key $K_{xy}$ from said value $\alpha^{xy}$ mod p;
   said encrypting device encrypting a randomly generated transient key $K_p$ and encrypting said data packet using said transient key $K_p$;
   said encrypted data packet being encapsulated in a transmission packet, including an unencrypted destination address for FWY and said temporary address $IP_d$ as a source address;
   FWX further including an interface circuit for transmitting said transmission packet to said FWY over said network.

27. The network as defined by claim 26, wherein said FWY further includes:
   a receiver for receiving said transmission packet from FWX and decapsulating said data packet from said transmission packet;
   a decrypting device coupled to said receiver for decrypting said data packet.

28. The network as defined by claim 27, wherein said decrypting device obtains a second DH certificate for said FWX and determines said public value $\alpha^x$ mod p, and computes the value of $\alpha^{xy}$ mod p, said decrypting device further deriving said key $K_{xy}$ from $\alpha^{xy}$ mod p.

29. The network as defined by claim 28, wherein said decrypting device utilizes said key $K_{xy}$ to decrypt said transient key $K_p$, and decrypts said dam packet using said transient key $K_p$.

30. The network as defined by claim 29, wherein said key $K_{xy}$ is derived from $\alpha^{xy}$ mod p using low order bits of $\alpha^{xy}$ mod p.

* * * * *